Figure 1:
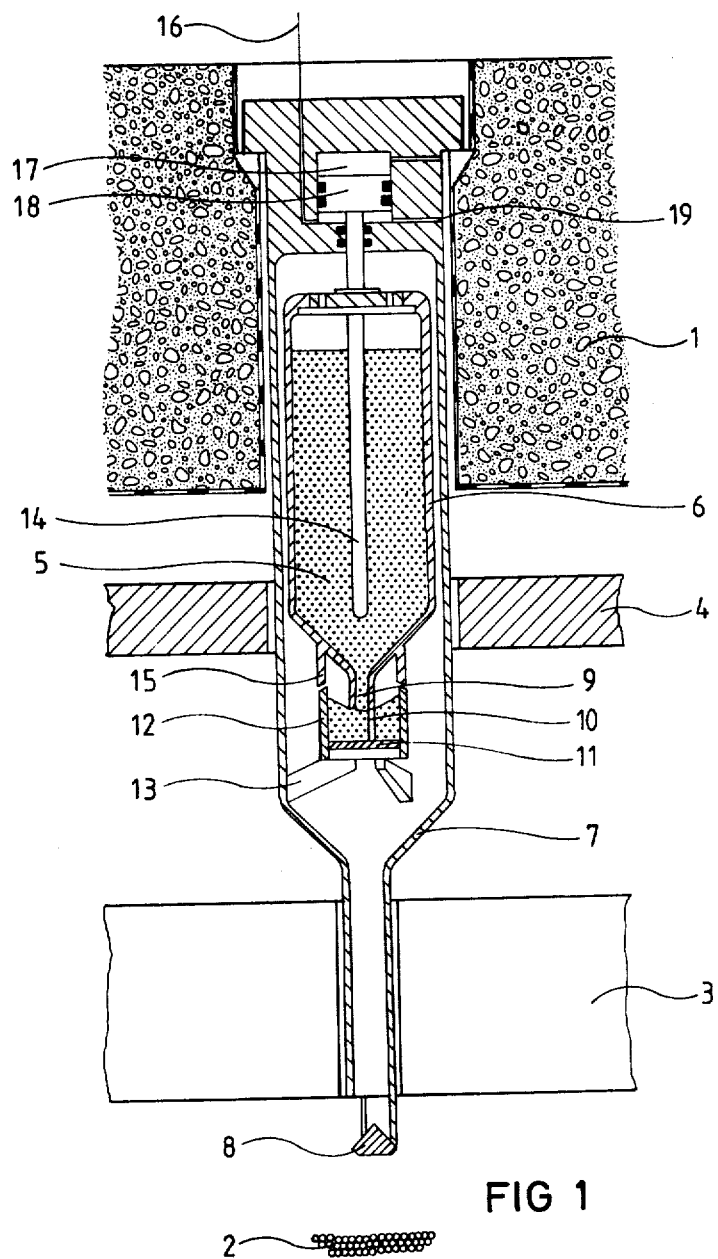

United States Patent [19]

Reutler et al.

[11] 4,411,860
[45] Oct. 25, 1983

[54] PEBBLE BED REACTOR WITH FEEDING DEVICE FOR ABSORBER MATERIAL AND METHOD FOR ITS OPERATION

[75] Inventors: Herbert Reutler, Cologne; Ulrich Müller-Frank, Bergisch-Gladbach; Manfred Ullrich, Bergisch-Gladbach; Hubert Schepers, Bergisch-Gladbach, all of Fed. Rep. of Germany

[73] Assignee: GHT, Gesellschaft für Hochtemperaturreaktor-Technik mbH, Bergisch-Gladbach, Fed. Rep. of Germany

[21] Appl. No.: 242,919

[22] Filed: Mar. 12, 1981

[30] Foreign Application Priority Data

Mar. 22, 1980 [DE] Fed. Rep. of Germany ....... 3011218

[51] Int. Cl.³ .................................................. G21C 7/14
[52] U.S. Cl. ................................... 376/338; 222/160; 222/504
[58] Field of Search ............... 376/338, 337; 222/353, 222/504, 160, 162

[56] References Cited

U.S. PATENT DOCUMENTS

| | | | |
|---|---|---|---|
| 2,590,202 | 3/1952 | Norton, Jr. | 222/353 |
| 3,037,673 | 6/1962 | Tornquist | 222/353 |
| 3,081,004 | 3/1963 | Laughlin et al. | 222/162 |
| 4,025,388 | 5/1977 | Jackson | 376/338 |

FOREIGN PATENT DOCUMENTS 54-19091 2/1979 Japan.

Primary Examiner—Harvey E. Behrend
Attorney, Agent, or Firm—Herbert L. Lerner; Laurence A. Greenberg

[57] ABSTRACT

Pebble-bed nuclear reactor capable of being shut down by a fluidized mass of bodies containing neutron-absorbing material, the fluidized mass of bodies being received in a storage container disposed above the pebble bed during normal operation of the reactor, the storage container being formed with a closable discharge opening, including a piston rigidly connected to the storage container and disposed below the discharge opening thereof, the piston being guided in a cylinder stationary relative to the reactor and being open at the top thereof, the storage container being displaceable in vertical direction between upper and lower end positions thereof, the piston, in the upper end position of the storage container, closing off the cylinder at the upper edge located at the open top of the cylinder and, in the lower end position of the storage container, the fluidized mass of bodies discharged from the discharge opening of the storage container being formed on top of the piston into a discharge cone having a height greater than the distance between the piston and the discharge opening and method for its operation.

4 Claims, 2 Drawing Figures

PEBBLE BED REACTOR WITH FEEDING DEVICE FOR ABSORBER MATERIAL AND METHOD FOR ITS OPERATION

The invention relates to a pebble bed nuclear reactor and, more particularly, to such a nuclear reactor capable of being shut down by a fluidized mass of bodies containing neutron-absorbing material, the fluidized mass of bodies being received in a storage container disposed above the pebble bed during normal operation of the reactor, the storage container being formed with a closable discharge opening.

Larger reactors of the foregoing general type are controlled during normal operation by absorber rods which are lowered to a greater or lesser extent to the surface of the pebble bed; by driving the absorber rods into the pebble bed, the reactor can be shut down. However, a second shut-down device is additionally required, which must be different from the first type, and which is operated independently from the latter. For this purpose, it has been previously proposed that balls or spheres containing absorber material, which are smaller in size than the fuel element pellets, be stored in a container above the reactor and that they be permitted to fall onto the surface of the pebble bed when required. The absorber balls or globules then dribble or trickle through the spaces between the fuel element pellets and distribute themselves in the fuel bed, so that the reactor is likewise shut down. According to a further proposal for reactors having a very small diameter, the absorber globules or balls can also be conducted in channels which are arranged in the reflector adjacent the fuel bed. As to the construction of the storage container and the mechanisms for rapidly and reliably emptying the storage container, possibilities are initially contemplated from that employed in other technological fields for the storage and feeding of granular materials. In conventional use of gates, valves and the like for closing the discharge opening of such a storage container, however, the destruction of some of the absorber balls due to the movement of the closure elements cannot be prevented. The shattered fragments resulting therefrom cannot be caught by the reactor bottom, which is of somewhat screen-like construction, from which they could be removed with the other absorber balls and fuel element pellets through special discharge openings; on the contrary, they could penetrate into the gas-circuit and, at the high gas velocities expected, cause damage to other parts of the installation i.e. the heat exchangers, for example. However, one cannot forego or dispense with the shut-off of the outflow of the absorber balls from the storage container, if the hereinafter further described operating procedure for such a reactor is to be carried out, through which the requirement for regularly recurring in-service tests as to the functionality of the second shut-down device can be fulfilled.

It is accordingly an object of the invention to provide a pebble bed reactor with a storage container for flowable or fluidized mass of bodies formed of neutron absorbing material, wherein the container can be opened and closed, as desired or required, without destroying those bodies, and also a method of operating the nuclear reactor and the device according to the invention which affords the repeated in-service testing.

With the foregoing and other objects in view, there is provided, in accordance with the invention, a pebble-bed nuclear reactor capable of being shut down by a fluidized mass of bodies containing neutron-absorbing material, the fluidized mass of bodies being received in a storage container disposed above the pebble bed during normal operation of the reactor, the storage container being formed with a closable discharge opening, comprising a piston rigidly connected to the storage container and disposed below the discharge opening thereof, the piston being guided in a cylinder stationary relative to the reactor and being open at the top thereof, the storage container being displaceable in vertical direction between upper and lower end positions thereof, the piston, in the upper end position of the storage container closing off the cylinder at the upper edge located at the open top of the cylinder and, in the lower end position of the storage container, the fuidized mass of bodies discharged from the discharge opening of the storage container, being formed on top of the piston into a discharge cone having a height greater than the distance between the piston and the discharge opening.

A static or dammed closure is formed, which is opened by the lifting of the storage container and the piston, wherein the distribution cone, which forms on top of the piston, does not extend up to the discharge opening, and the bodies newly discharging therefrom slide down the cone and fall out of the cylinder. By lowering the storage container and thereby, also the piston in the cylinder, a cone of discharged absorber material can form which extends up to the discharge opening and prevents further discharge of absorber balls.

In accordance with another feature of the invention, the nuclear reactor includes a device disposed in the storage container for measuring the level therein to which the fluidized mass of bodies has been filled.

This device for measuring the filling-level becomes significant in connection with the repeated in-service testing in greater detail hereinbelow.

In accordance with a further feature of the invention, the nuclear reactor includes a ring fastened to the lower end of the storage container, the ring being coaxial to the cylinder and having a diameter substantially equal thereto.

Due to this feature of the invention, the closure of the storage container is not rendered ineffective during the occurrence of vibrations or earth quakes.

In accordance with a concommitant aspect of the invention, there is provided a method of operating the foregoing pebble bed nuclear reactor which comprises occasionally moving the storage container for a brief period of time from the lower to the upper end position thereof and, thereafter, monitoring the reactivity of the reactor to determine if a decrease in reactivity has occurred which corresponds to the amount of neutron-absorbing material expected to be discharged from the storage container during the brief time period.

As a result of the method of operation of the reactor according to the invention, repetitive tests proving the functional capability of the second shut-down device can be performed without stopping the operation of the reactor, or, indeed, without having to open the reactor vessel. By operating the device for brief time intervals, the mobility of the storage container and the flowability or fluidity of the contents thereof are established. The quantity of absorber material which flows out during the few seconds wherein the storage container is open can be calculated on the one hand by measuring the difference of the filling levels and on the other hand by measuring the effect of the reactivity of the reactor.

This effect of influence can only be slight, and is compensated for by the "burn-up" of the absorber material by itself in a short time. The then spent absorber balls together with the likewise spent fuel element-pebbles are then removed from the reactor after a given period of time.

Other features which are considered as characteristic for the invention are set forth in the appended claims.

Although the invention is illustrated and described herein as embodied in a pebble bed reactor with feeding device for absorber material and method for its operation, it is nevertheless not intended to be limited to the details shown, since various modifications and structural changes may be made therein without departing from the spirit of the invention and within the scope and range of equivalents of the claims.

Figure 2:
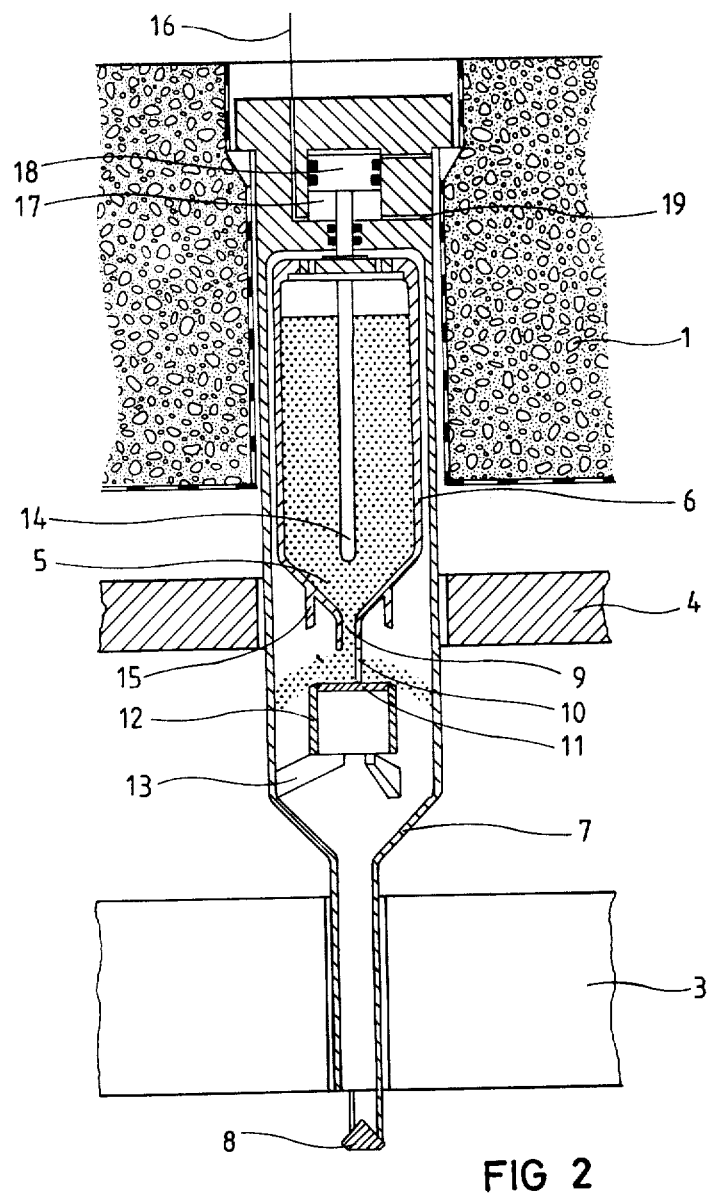

The construction and method of operation of the invention, however, together with additional objects and advantages thereof will be best understood from the following description of specific embodiments when read in connection with the accompanying drawings, in which:

FIG. 1 is a fragmentary sectional view of a pebble bed nuclear reactor having a feeding device for absorber material according to the invention in closed condition thereof; and FIG. 2 is a view similar to that of FIG. 1 with the feeding device in open condition thereof.

Referring now to the figures of the drawings, there is shown therein, in a reactor vessel 1, formed for example of prestressed concrete, a spherical pellet or pebble bed 2 of several million fuel elements, respectively, of approximately 6 cm diameter forming the reaction zone of the reactor vessel 1, the fuel elements being traversed by a cooling gas, such as helium, for example flowing from the top downwardly through the fuel bed. A reflector 3 is provided for improving neutron economy, and a heat shield 4 is provided to protect the reactor vessel 1 from heat radiation. To shut down this reactor which may be, for example, of 1640 MW, a quantity of approximately 1.8 $m^3$ of absorber balls or shot 5, formed of boron carbide of approximately 10 mm diameter, is required. This quantity would be stored, for example, in six storage containers 6 uniformly distributed over the cross-section of the reactor, of which only one is illustrated in the figures. The container 6 is axially movably disposed in a guide tube 7, which is provided with a distributing or scatter cone 8 at the lower end thereof. As viewed in the figures, the scatter cone 8 is effecting a very uniform distribution of the absorber balls 5 over the surface of the pellet bed 2. The storage container 6 is formed with a discharge opening 9 at the lower end thereof. A piston 11 is fixedly connected by a bar or web 10 to the container 6. The piston 11 slides in a cylinder 12, which is secured to the guide tube 7 by several radial braces or struts 13. For measuring the level to which the absorber balls 5 are filled in the storage container 6, a suitable conventional measuring device 14 is provided; because graphite is electrically conductive, the use of a filling-level meter operating on the principle of induction seems practical, such an instrument having been previously proposed by applicant for use with liquid metals.

In FIG. 1 a condition of the reactor is shown, wherein the storage container 6 is in the lower end position thereof. The piston 11 is located at the lower end of the cylinder 12, and the latter has been filled with absorber balls 5 to an extent that the discharge opening 9 has become clogged therewith, and the storage container 6 is then closed. A ring 15, which is fastened to the storage container 6 and is coaxial to the cylinder 12, prevents the absorber balls 5 from being hurled out of the cylinder 12 upon the occurrence of vibrations, and otherwise break the closure of the container 6. The ring 15 need not hug the cylinder 12 tightly; nevertheless, the size of the remaining gap therebetween should be less than the diameter of one absorber ball 5. Via a pipe line 16, a pneumatic cylinder 17 can be pressure-activated, advantageously, by helium already circulating in the reactor, in a manner that an additional piston 18 is displaced upwardly, and thereby lifts the storage container 6; the condition or phase shown in FIG. 2 is thereby reached. Due to the lifting of the storage container 6 and, thereby, of the piston 11 to the upper edge of the cylinder 12, the distributing cone forming on the piston 11 cannot extend up to the discharge opening 9 anymore. The absorber balls 5 then fall from the storage container 6 through the guide tube 7 onto the pebble bed 2, until the storage container is completely emptied, if it is intended that the reactor be shut down. If only proof of the functional capability of the device is required in an in-service test, the pressure in the hydraulic cylinder 17 is released, after a few seconds, through an additional pipeline 19, and the container moves downward again by its own weight i.e. due to the force of gravity, and further outward flow of the absorber balls 5 is interrupted.

The reactivity in the pebble bed can be measured by non-illustrated conventional instruments. By decrease in reactivity measured by these instruments, after the shut-off device is operated for a brief time period, it can be shown, independently of the measurement of the filling-level in the device 14, that a given number of absorber balls 5 has flowed out of the storage container 6 and, thereby, that the shut-off device is functional or operative.

There are claimed:

1. Pebble-bed nuclear reactor capable of being shut down by a fluidized mass of bodies containing neutron-absorbing material, the fluidized mass of bodies being received in a storage container disposed above the pebble bed during normal operation of the reactor, the storage container being formed with a closable discharge opening, comprising a piston rigidly connected to the storage container and disposed below the discharge opening thereof, said piston being guided in a cylinder stationary relative to the reactor and being open at the top thereof, the storage container being displaceable in vertical direction between upper and lower end positions thereof, said piston, in said upper end position of the storage container, closing off said cylinder at the upper edge located at said open top of said cylinder and, in said lower end position of the storage container, the fluidized mass of bodies discharged from the discharge opening of the storage container being formed on top of said piston into a discharge cone having a height greater than the distance between said piston and the discharge opening.

2. Nuclear reactor according to claim 1 including a device disposed in the storage container for measuring the level therein to which the fluidized mass of bodies has been filled.

3. Nuclear reactor according to claim 1 or 2 including a ring fastened to the lower end of the storage container, said ring being coaxial to said cylinder and having a diameter substantially equal thereto.

4. Method of operating a pebble bed nuclear reactor according to claim 1 which comprises occasionally moving the storage container for a brief period of time from the lower to the upper end position thereof and, thereafter, monitoring the reactivity of the reactor to determine if a decrease in reactivity has occurred which corresponds to the amount of neutron-absorbing material expected to be discharge from the storage container during said brief time period.

* * * * *